United States Patent
Li et al.

(10) Patent No.: US 11,606,307 B2
(45) Date of Patent: Mar. 14, 2023

(54) DATA STREAM PROCESSING METHOD AND NETWORK ELEMENT DEVICE

(71) Applicant: HUAWEI TECHNOLOGIES CO., LTD., Guangdong (CN)

(72) Inventors: Rixin Li, Shenzhen (CN); Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 16/984,578

(22) Filed: Aug. 4, 2020

(65) Prior Publication Data
US 2020/0366405 A1 Nov. 19, 2020

Related U.S. Application Data

(63) Continuation of application No. PCT/CN2019/074488, filed on Feb. 1, 2019.

(30) Foreign Application Priority Data

Feb. 7, 2018 (CN) .......................... 201810122800.9

(51) Int. Cl.
*H04L 7/00* (2006.01)
*H04L 47/38* (2022.01)
(Continued)

(52) U.S. Cl.
CPC ................ *H04L 47/38* (2013.01); *H04L 1/00* (2013.01); *H04L 1/0002* (2013.01);
(Continued)

(58) Field of Classification Search
CPC . H04L 1/0008; H04L 1/0002; H04L 25/4908; H04L 47/34; H04L 47/38; H04L 1/00; H04L 1/0007; H04L 25/49
See application file for complete search history.

(56) References Cited

U.S. PATENT DOCUMENTS 6,781,984 B1 * 8/2004 Adam ..................... H04J 3/062
370/413
8,411,677 B1 * 4/2013 Colloff .................... H04L 69/12
709/219
(Continued)

FOREIGN PATENT DOCUMENTS

CN 101309258 A 11/2008
CN 102959891 A 3/2013
(Continued)

OTHER PUBLICATIONS

IEEE Std 802.3bs-2017, IEEE Standard for Ethernet Amendment 10: Media Access Control Parameters, Physical Layers, and Management Parameters for 200 Gb/s and 400 GB/s Operation, Dec. 2017. total 372 pages.
(Continued)

*Primary Examiner* — Phuc H Tran
(74) *Attorney, Agent, or Firm* — WHDA, LLP

(57) ABSTRACT

This application provides a data stream processing method and a network element device. The method includes: obtaining, by a first network element device, a first data stream, where the first data stream includes a first data unit and a first data padding unit; and adjusting, by the first network element device, a quantity of second data padding units in the first data stream, where a relative position of the first data unit and the first data padding unit in the first data stream is the same as a relative position of the first data unit and the first data padding unit in a second data stream, and the second data stream is an adjusted first data stream. When adjusting a rate, the first network element device does not add or delete the first data padding unit in the first data stream.

17 Claims, 11 Drawing Sheets

(51) Int. Cl.
  *H04L 1/00* (2006.01)
  *H04L 25/49* (2006.01)
  *H04Q 11/00* (2006.01)
  *H04L 47/34* (2022.01)
(52) U.S. Cl.
  CPC ............ *H04L 1/0008* (2013.01); *H04L 25/49* (2013.01); *H04L 25/4908* (2013.01); *H04L 47/34* (2013.01); *H04Q 11/00* (2013.01)

(56) References Cited

U.S. PATENT DOCUMENTS

| | | | | |
|---|---|---|---|---|
| 8,489,758 | B2* | 7/2013 | Astrom | H04L 65/607 375/240 |
| 8,848,526 | B1* | 9/2014 | Channabasappa | H04L 12/6418 370/300 |
| 10,951,512 | B2* | 3/2021 | Zhong | H04L 45/125 |
| 2003/0212985 | A1 | 11/2003 | Chan et al. | |
| 2008/0100481 | A1* | 5/2008 | Horie | H03M 7/04 341/95 |
| 2015/0271074 | A1 | 9/2015 | Hirth | |
| 2017/0005742 | A1 | 1/2017 | Gareau et al. | |
| 2017/0126552 | A1* | 5/2017 | Pfaff | H04L 41/046 |
| 2019/0097914 | A1 | 3/2019 | Zhong et al. | |
| 2021/0203588 | A1* | 7/2021 | Zhong | H04L 7/041 |

FOREIGN PATENT DOCUMENTS

| | | | |
|---|---|---|---|
| CN | 106301678 A | 1/2017 | |
| CN | 107438029 A | 12/2017 | |
| WO | 2017202158 A1 | 11/2017 | |
| WO | WO-2017202158 A1 * | 11/2017 | ............ H04J 3/1658 |
| WO | 2018000894 A1 | 1/2018 | |

OTHER PUBLICATIONS

Flex Ethernet, Implementation Agreement, IA# OIF-FLEXE-01.0, Mar. 2016. 31 pages.
International Search Report dated Apr. 16, 2019, issued in counterpart Application No. PCT/CN2019/074488, with English Translation. (11 pages).
Office Action dated Mar. 29, 2021, issued in counterpart CN application No. 201810122800.9, with English translation. (18 pages).
Extended (Supplementary) European Search Report dated Feb. 23, 2021, issued in counterpart EP Application No. 19751514.1. (8 pages).
Huawei, HiSilicon, E-TFC selection for UL MIMO, 3GPP TSG-RAN2 Meeting #79bis , R2-124799, Bratislava, Slovakia, Oct. 8-12, 2012, 3 pages.
Zhao Fei et al, Fill absent values in massive domain data stream, Journal of Nanjing University(Natural Sciences), 2011, 8 pages.
Notice of Allowance dated Jan. 14, 2022, issued in counterpart CN Application No. 201810122800.9, with English Translation of Notification to Grant Patent Right for Invention. (6 pages).

* cited by examiner

| | 0 0 0 0 0 0 0 0 0 0 | 0 1 | 1 1 1 1 1 1 1 1 1 | 2 2 | 2 2 2 2 2 2 2 2 | 3 3 3 | 3 3 3 3 3 3 3 | 4 4 4 4 | 4 4 4 4 4 4 | 5 5 5 5 5 | 5 5 5 5 5 | 6 6 6 6 6 6 |
|---|---|---|---|---|---|---|---|---|---|---|---|---|
| | 0 1 2 3 4 5 6 7 8 9 | 0 1 | 2 3 4 5 6 7 8 9 | 0 1 | 2 3 4 5 6 7 8 9 | 0 1 2 | 3 4 5 6 7 8 9 | 0 1 2 3 | 4 5 6 7 8 9 | 0 1 2 3 4 | 5 6 7 8 9 | 0 1 2 3 4 5 |
| 10 | 0x1E | /E/ (0x1E) | /E/ (0x1E) | /E/ (0x1E) | /E/ (0x1E) | /E/ (0x1E) | /E/ (0x1E) | /E/ (0x1E) | /E/ (0x1E) |
| 10 | 0x1E | 0x00 | 0x00 | 0x00 | 0x00 | 0x00 | 0x00 | 0x00 | 0x00 |

DATA STREAM PROCESSING METHOD AND NETWORK ELEMENT DEVICE

CROSS-REFERENCE TO RELATED APPLICATIONS

This application is a continuation of International Application No. PCT/CN2019/074488, filed on Feb. 1, 2019, which claims priority to Chinese Patent Application No. 201810122800.9, filed on Feb. 7, 2018, The disclosures of the aforementioned applications are hereby incorporated by reference in their entireties.

TECHNICAL FIELD

This application relates to the field of communications technologies, and more specifically, to a data stream processing method and a network element device.

BACKGROUND

It is well-known in the industry that flexible Ethernet (FlexE) is used as an interface technology, and a FlexE client device exchange technology extended based on the FlexE interface technology is also gradually accepted in the industry. However, in a current technical solution, an intermediate node in a network performs rate matching, to meet rate requirements of different nodes. Specifically, the intermediate node in the network may add or delete an idle code block in a data stream from a client device, to implement the rate matching.

Therefore, how to avoid disorder of code blocks in the data stream is a problem that urgently needs to be resolved.

SUMMARY

This application provides a data stream processing method and a network element device, to avoid that a data unit in a data stream input to a network and a data unit output by the network are in disorder.

According to a first aspect, an embodiment of this application provides a data stream processing method, including: obtaining, by a first network element device, a first data stream, where the first data stream includes a first data unit and a first data padding unit; and adjusting, by the first network element device, a quantity of second data padding units in the first data stream, where a relative position of the first data unit and the first data padding unit in the first data stream is the same as a relative position of the first data unit and the first data padding unit in a second data stream, and the second data stream is an adjusted first data stream According to the foregoing technical solution, the first network element device may implement rate matching by adjusting the quantity of second data padding units in the first data stream. In other words, when adjusting a rate, the first network element device does not add or delete the first data padding unit in the first data stream. In this way, disorder of the adjusted first data stream to be output can be avoided.

Optionally, in a possible implementation of the first aspect, before the obtaining, by a first network element device, a first data stream, the method further includes: obtaining, by the first network element device, a third data stream, where the third data stream includes the first data unit and the second data padding unit, and the second data padding unit is an idle data unit; and the obtaining, by a first network element device, a first data stream includes: replacing, by the first network element device, the second data padding unit in the third data stream with the first data padding unit, to obtain the first data stream Based on the foregoing technical solution, an intermediate node in the network may still comply with a rate matching solution in the prior art. In other words, based on the foregoing technical solution, the intermediate node may directly add or delete the idle data unit in the second data stream. In this way, without a need of configuring the intermediate node, disorder of the adjusted first data stream to be output can be avoided only by reconfiguring an ingress node and an egress node in the network.

Optionally, in a possible implementation of the first aspect, the adjusting, by the first network element device, a quantity of second data padding units in the first data stream includes: adding, by the first network element device, the second data padding unit to the first data stream, where the second data stream includes N consecutive units, K consecutive units in the N consecutive units are the second data padding unit, a unit other than the K consecutive units in the N consecutive units is the first data unit or the first data padding unit, K is a positive integer greater than or equal to 1, and N is a positive integer greater than K. Based on the foregoing technical solution, second data padding units that can be added or deleted are consecutive, so that nodes in the network can determine positions of the second data padding units that can be added or deleted.

Optionally, in a possible implementation of the first aspect, the first data stream further includes the second data padding unit, and the adjusting, by the first network element device, a quantity of second data padding units in the first data stream includes: adjusting, by the first network element device, the quantity of second data padding units in the first data stream based on a first rate and a second rate, where the first rate is a rate of the first data stream received by the first network element device, and the second rate is a rate at which the first network element device sends the second data stream. Based on the foregoing technical solution, the first network element device may perform rate matching by adding or deleting the second data padding unit based on a rate requirement.

Optionally, in a possible implementation of the first aspect, the first data stream includes a first unit set, the first unit set includes N consecutive units, and the N consecutive units included in the first unit set include $M_1$ second data padding units and $K_1$ first units, the first unit is the first data unit or the first data padding unit, N is a positive integer greater than or equal to 2, $M_1$ and $K_1$ are positive integers greater than or equal to 1, and a sum of $M_1$ and $K_1$ is N; the second data stream includes a second unit set, the second unit set includes N consecutive units, and the N consecutive units included in the second unit set include $M_2$ second data padding units and $K_2$ first units, where $M_2$ is a positive integer greater than or equal to 0, $K_2$ is a positive integer greater than or equal to 1, and a sun of $M_2$ and $K_2$ is N; and the $K_1$ first units are a subset of the $K_2$ first units, or the $K_2$ first units are a subset of the $K_1$ first units, or the $K_2$ first data units are the same as the $K_1$ first units. In the foregoing technical solution, a quantity of data unit sets in the first data stream is unchanged before and after adjustment.

Optionally, in a possible implementation of the first aspect, the first data stream includes a first unit set, the first unit set includes $N_1$ consecutive units, the $N_1$ consecutive units include $M_1$ second data padding units and K first units, the first unit is the first data unit or the first data padding unit, $N_1$ is a positive integer greater than or equal to 2, $M_1$ and K are positive integers greater than or equal to 1, and a sum of $M_1$ and K is $N_1$; and the second data stream includes a second unit set, the second unit set includes $N_2$ consecutive units, the $N_2$ consecutive units include $M_2$ data padding units and K first units, $M_2$ is a positive integer greater than or equal to 0, and a sum of $M_2$ and K is $N_2$. In the foregoing technical solution, a quantity of first data units and a quantity of first padding units in each data unit set in the first data stream are unchanged before and after adjustment.

Optionally, in a possible implementation of the first aspect, the obtaining, by a first network element device, a first data stream includes: obtaining, by the first network element device, S first input data streams; and multiplexing, by the first network element device, the S first input data streams as the first data stream, where S is a positive integer greater than or equal to 2. In the foregoing technical solution, the first network element device may multiplex a plurality of data streams as one data stream, so that transmission efficiency can be improved.

Optionally, in a possible implementation of the first aspect, the multiplexing, by the first network element device, the S first input data streams as the first data stream includes: obtaining, by the first network element device, second units in the S first input data streams through polling, where the second units include the first data unit and the first data padding unit; and combining, by the first network element device, the obtained second units as the first data stream. In the foregoing technical solution, the first network element device may multiplex the S input data streams as the first data stream through polling, so that the first network element device can implement a multiplexing operation.

Optionally, in a possible implementation of the first aspect, each input data stream in the S first input input streams includes T data unit sets, and the obtaining, by the first network element device, second units in the S first input data streams through polling includes: obtaining, by the first network element device, all second units in P data unit sets in one first input data stream each time, where P is a positive integer greater than or equal to 1. In the foregoing technical solution, the first network element device may obtain all the second units in an input data stream in each round of polling, so that the first network element device can implement the multiplexing operation, and fairly obtain the second unit in each input data stream.

Optionally, in a possible implementation of the first aspect, the obtaining, by the first network element device, second units in the S first input data streams through polling includes: obtaining, by the first network element device, Q second units in one first input data stream each time, where Q is a positive integer greater than or equal to 1. In the foregoing technical solution, the first network element device may obtain Q second units in an input data stream in each round of polling, so that the first network element device can implement the multiplexing operation, and fairly obtain the second unit in each input data stream.

Optionally, in a possible implementation of the first aspect, the obtaining, by first network element device, S first input data streams includes: obtaining, by the first network element device, S second input data streams, where each of the S second input data streams includes the first data unit and the second data padding unit, and the second data padding unit is an idle data unit; and replacing, by the first network element device, the second data padding unit in each of the S second input data streams with the first data padding unit, to obtain the S first input data streams. Based on the foregoing technical solution, the intermediate node in the network may still comply with the rate matching solution in the prior art. In other words, based on the foregoing technical solution, the intermediate node may directly add or delete the idle data unit in the second data stream. In this way, without a need of configuring the intermediate node, disorder of the adjusted first data stream to be output can be avoided only by reconfiguring an ingress node and an egress node in the network.

According to a second aspect, an embodiment of this application provides a data stream processing method. The method includes: obtaining by a first network element device, a first data stream, where the first data stream includes a first data unit, a first data padding unit, and a second data padding unit; and determining, by the first network element device, a second data stream based on the first data stream, where the second data stream includes the first data unit and the first data padding unit, and a relative position of the first data unit and the first data padding unit in the first data stream is the same as a relative position of the first data unit and the first data padding unit in the second data stream According to the technical solution, it can be avoided that a data unit in a data stream input to a network and a data unit output by the network are in disorder.

Optionally, in a possible implementation of the second aspect, the determining, by the first network element device, a second data stream based on the first data stream includes: obtaining, by the first network element device, the first data padding unit and the first data unit in the first data stream and determining the second data stream.

Optionally, in a possible implementation of the second aspect, the determining, by the first network element device, a second data stream based on the first data stream includes: obtaining, by the first network element device, the first data unit and the second data padding unit in the first data stream; and replacing, by the first network element device, the second data padding unit with the first data padding unit, to obtain the second data stream, where the first data padding unit is an idle data unit. Based on the foregoing technical solution, an intermediate node in the network may still comply with a rate matching solution in the prior art. In other words, based on the foregoing technical solution, the intermediate node may directly add or delete the idle data unit in the second data stream. In this way, without a need of configuring the intermediate node, disorder of the adjusted first data stream to be output can be avoided only by reconfiguring an ingress node and an egress node in the network.

Optionally, in a possible implementation of the second aspect, the method further includes: demultiplexing, by the first network element device, the second data stream as S first output data streams, and outputting the S first output data streams. In the foregoing technical solution, the first network element device may multiplex a plurality of data streams as one data stream, so that transmission efficiency of the network and processing efficiency of the intermediate node in the network can be improved.

Optionally, in a possible implementation of the second aspect, the determining, by the first network element device, a second data stream based on the first data stream includes: obtaining, by the first network element device, the first data unit and the second data padding unit in the first data stream, and determining the second data stream; and the method further includes: demultiplexing, by the first network element device, the first data stream as S second output data streams; replacing, by the first network element device, the second data padding unit in each output data stream in the S pieces of second output data with the first data padding unit, to obtain S first output data streams, where the first data padding unit is an idle data unit; and outputting, by the first network element device, the S first output data streams. Based on the foregoing technical solution, the intermediate node in the network may still comply with the rate matching solution in the prior art. In other words, based on the foregoing technical solution, the intermediate node may directly add or delete the idle data unit in the second data stream. In this way, without a need of configuring the intermediate node, disorder of the adjusted first data stream to be output can be avoided only by reconfiguring an ingress node and an egress node in the network.

According to a third aspect, an embodiment of this application provides a data stream multiplexing method. The method includes: obtaining, by a first network element device, S first input data streams, where at least one of the S first input data streams includes a first data unit and an idle data unit; and multiplexing, by the first network element device, the first data unit in each of the S first input data streams as the first data stream, where S is a positive integer greater than or equal to 2. Based on the foregoing technical solution, when multiplexing the S first input data streams as the first data stream, the first network element device multiplexes only the first data units in the S first input data streams as the first data stream.

Optionally, in a first possible implementation of the third aspect, the multiplexing, by the first network element device, the first data unit in each of the S first input data streams as the first data stream includes: obtaining, by the first network element device, the first data units in the S first input data streams through polling; and combining, by the first network element device, the obtained first data units as the first data stream. In the foregoing technical solution, the first network element device may multiplex the S input data streams as the first data stream through polling, so that the first network element device can implement a multiplexing operation.

Optionally, in a first possible implementation of the third aspect, each input data stream in the S first input input streams includes T data unit sets, and the obtaining, by the first network element device, the first data units in the S first input data streams through polling includes: obtaining, by the first network element device, all first data units in P data unit sets in one first input data stream each time, where P is a positive integer greater than or equal to 1. In the foregoing technical solution, the first network element device may obtain all the first data units in one input data stream in each round of polling, so that the first network element device can implement the multiplexing operation, and fairly obtain the first data unit in each input data stream.

Optionally, in a first possible implementation of the third aspect, the obtaining, by the first network element device, the first data units in the S first input data streams through polling includes: obtaining, by the first network element device, Q first data units in a first input data stream each time, where Q is a positive integer greater than or equal to 1. In the foregoing technical solution, the first network element device may obtain Q first data units in an input data stream in each round of polling, so that the first network element device can implement the multiplexing operation, and fairly obtain the first data unit in each input data stream.

According to a fourth aspect, an embodiment of this application further provides a network element device, and the network element device includes units configured to implement any one of the first aspect or the possible implementations of the first aspect.

According to a fifth aspect, an embodiment of this application further provides a network element device, and the network element device includes units configured to implement any one of the second aspect or the possible implementations of the second aspect.

According to a sixth aspect, an embodiment of this application further provides a network element device, and the network element device includes units configured to implement any one of the third aspect or the possible implementations of the third aspect.

According to a seventh aspect, an embodiment of this application provides a network element device, and the network element device includes: a memory, configured to store a program; and a processor, configured to execute the program stored in the memory. When the program is executed, the processor is configured to perform the method according to any one of the first aspect or the possible implementations of the first aspect. Optionally, the network element device is a chip or an integrated circuit.

According to an eighth aspect, an embodiment of this application provides a network element device, and the network element device includes: a memory, configured to store a program; and a processor, configured to execute the program stored in the memory. When the program is executed, the processor is configured to perform the method according to any one of the second aspect or the possible implementations of the second aspect. Optionally, the network element device is a chip or an integrated circuit.

According to a ninth aspect, an embodiment of this application provides a network element device, and the network element device includes: a memory, configured to store a program and a processor, configured to execute the program stored in the memory. When the program is executed, the processor is configured to perform the method according to any one of the third aspect or the possible implementations of the third aspect. Optionally, the network element device is a chip or an integrated circuit.

According to a tenth aspect, an embodiment of this application provides a chip, configured to perform the method according to any one of the first aspect or the possible implementations of the first aspect.

According to an eleventh aspect, an embodiment of this application provides a chip, configured to perform the method according to any one of the second aspect or the possible implementations of the second aspect.

According to a twelfth aspect, an embodiment of this application provides a chip, configured to perform the method according to any one of the third aspect or the possible implementations of the third aspect.

According to a thirteenth aspect, an embodiment of this application provides a computer-readable storage medium. The computer-readable storage medium stores an instruction, and when the instruction is run on a computer, the computer is enabled to perform the method according to the foregoing aspects.

According to a fourteenth aspect, an embodiment of this application provides a computer program product including an instruction. When the computer program product is run on a computer, the computer is enabled to perform the method according to the foregoing aspects.

BRIEF DESCRIPTION OF DRAWINGS

FIG. 13 is a schematic diagram of an idle 64/66b code block;

FIG. 14 is a schematic diagram of the first data unit when the data unit is a code block and is a 64/66b code block;

DESCRIPTION OF EMBODIMENTS

The following describes technical solutions in this application with reference to accompanying drawings.

Figure 1:
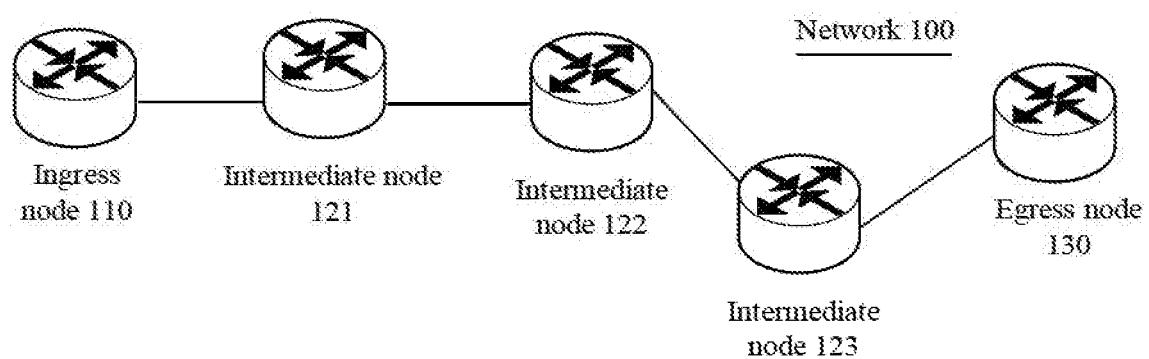
FIG. 1 is a schematic structural diagram of a network according to an embodiment of this application.

FIG. 1 is a schematic structural diagram of a network according to an embodiment of this application. The network 100 in FIG. 1 includes an ingress node 110, an intermediate node 121, an intermediate node 122, an intermediate node 123, and an egress node 130. The ingress node 110 may obtain an input data stream sent by one or more client devices and send the obtained input data stream to the intermediate node 121. The intermediate node 121 may send, to the intermediate node 122, the data stream obtained from the ingress node 110. The intermediate node 122 may send, to the intermediate node 123, the data stream obtained from the ingress node 121. The intermediate node 123 may send, to the egress node 130, the data stream obtained from the intermediate node 122. The egress node 130 may send, to one or more client devices, the data stream obtained from the intermediate node 123.

Embodiments of this application may be applied to the network in FIG. 1. A network element device in the embodiments of this application may be the ingress node, the intermediate node, or the egress node in FIG. 1.

Figure 2:
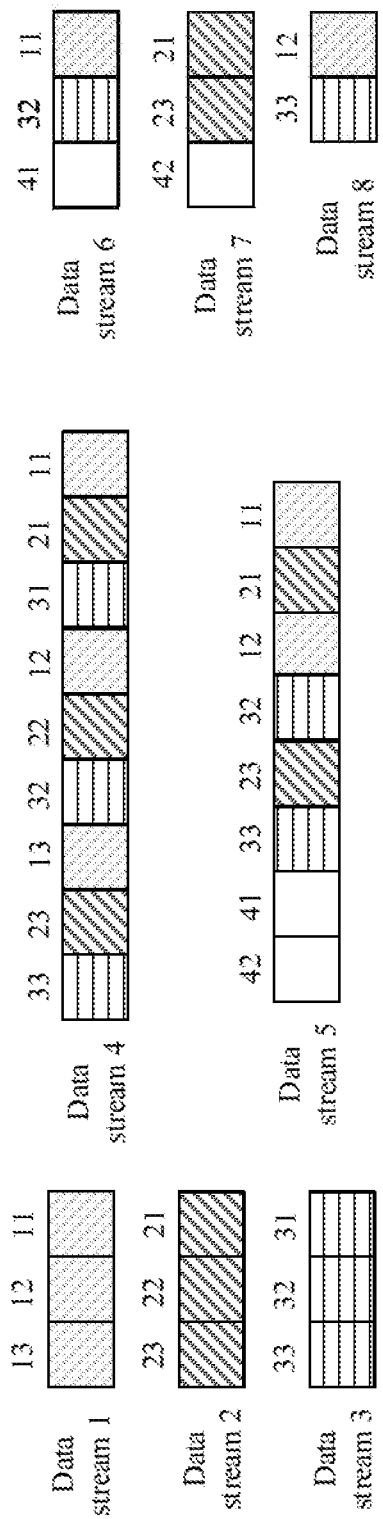
FIG. 2 is a schematic diagram of a data stream processing solution.

FIG. 2 is a schematic diagram of a data stream processing solution. As shown in FIG. 2, a data stream 1 from a client device 1, a data stream 2 from a client device 2, and a data stream 3 from a client device 3 are multiplexed as a data stream 4. Specifically, when the data stream, the data stream 2, and the data stream 3 are multiplexed, a network ingress node sequentially obtains a code block from each of the three data streams, and combines the code blocks as the data stream 4. As shown in FIG. 2, the first three code blocks of the data stream 4 are a code block 11 in the data stream 1, a code block 21 in the data stream 2, and a code block 31 in the data stream 3, and the fourth code block to the sixth code block of the data stream 4 are a code block 12 in the data stream 1, a code block 22 in the data stream 2, and a code block 32 in the data stream 3. The data stream 1 includes an idle code block 13, the data stream 2 includes the idle code block 22, and the data stream 3 includes the idle code block 31. When performing rate matching, an intermediate node may delete the idle code block 13, the idle code block 22, and the idle code block 31. In addition, when performing rate matching, the intermediate node may further add an idle code block. For example, the intermediate node may add an idle code block 41 and an idle code block 42. A data stream 5 is a to-be-demultiplexed data stream after the code blocks 13, 22, and 31 are deleted and the code blocks 41 and 42 are added. When the data stream is demultiplexed, an egress node sequentially uses the code blocks in the data stream as code blocks in data streams of the client device 1, the client device 2, and the client device 3. As shown in FIG. 2, after the multiplexing, the data stream of the client device 1 is a data stream 6, the data stream of the client device 2 is a data stream 7, and the data stream of the client device 3 is a data stream 8. As shown in FIG. 2, the data stream 6 further includes a code block in the data stream 3, a position of an idle code block in the data stream 7 changes, and the data stream 8 further includes a code block in the data stream 1. It can be learned that, if multiplexing, demultiplexing, and rate matching are performed on the data streams in the manner shown in FIG. 2, time sequences of code blocks in the data streams that are output after the demultiplexing are in disorder.

Similarly, if the network ingress node obtains a data stream, time sequences of the data stream may be in disorder in a network transmission process.

The network element device described in the embodiments of this application may be a packet transport network (PTN) device, a router, or the like.

A data unit (including a first data unit, a data unit, a first data padding unit, a second data padding unit, and the like) described in the embodiments of this application may be a data unit (namely, a byte) before the data unit is encoded by using a coding scheme such as 64/66b or 8/10b, or may be a data unit (namely, a code block) after 64/66b or 8/10b coding is performed. In other words, the byte may be encoded by using the coding scheme such as 64/66b or 8/10b to obtain the code block.

The network element device may process a data unit in a data stream before encoding, or may process a data unit in a data stream after encoding. The data unit processed before encoding is a byte, and the data unit processed after encoding is a code block.

For example, if the data stream is processed at a reference point interface for FlexE client based switching, the data unit is a code block. If the network element device processes the data stream at a reference node interface for FlexE timeslot based switching, the data unit is a code block. If the network element device processes the data stream at an x medium independent interface (MII), the data unit is a byte. A person skilled in the art may understand that xMII is a general term of MII. For example, an MII with a rate of 10 Gb/s may become an XGMII, an MII with a rate of 40 Gb/s may be referred to as an XLGMII, and an MII with a rate of 100 Gb/s may be referred to as a CGMII.

An idle data unit data described in the embodiments of this application is an idle (Idle) data unit defined in an existing protocol, for example, an idle block or an idle byte.

For example, FIG. 13 is a schematic diagram of an idle 64/66b code block. When determining that a code block is the code block in FIG. 13, the network element device may determine that the code block is an idle code block. A 100G Ethernet is used as another example, and an idle byte may be a byte whose value is 0x07. In other words, when determining that a byte is 00x7 (in other words, a binary value is 00000111), the network element device may determine that the byte is an idle byte.

In some embodiments, a first data padding code block may be an idle data unit. In this case, the first data padding code block may be the foregoing idle data unit. The second data padding code block may be a data Unit that is different from the idle data unit and that is of the first data unit from the client device.

In some other embodiments, a second data padding code block may be an idle data unit. In this case, the first data padding code block may be the foregoing data unit. The first data padding code block may be a data unit that is different from the idle data unit and that is of the first data nit from the client device. For ease of description, a data padding unit different from the idle data unit is referred to as a non-idle data padding unit below.

Figure 14:
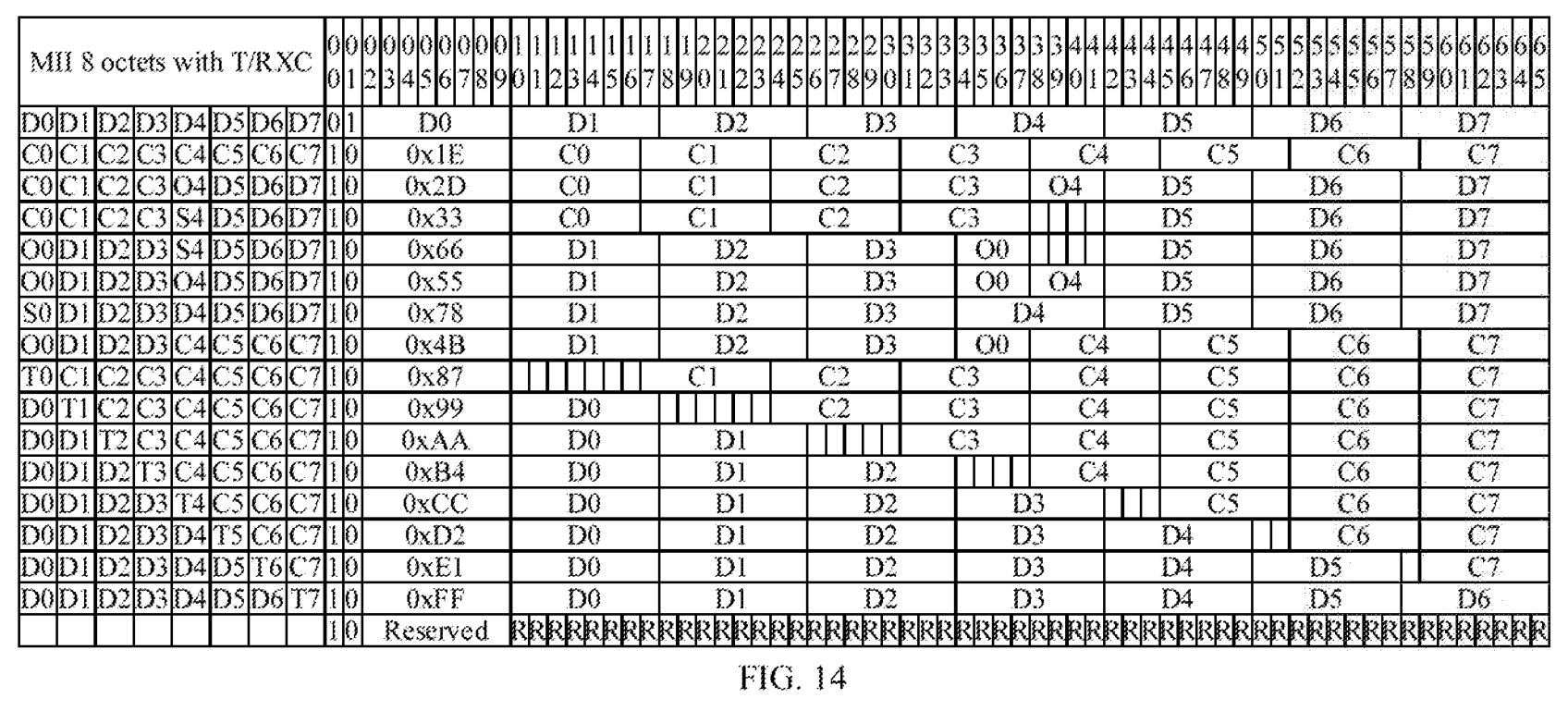

For example, FIG. 14 is a schematic diagram of the first data unit when the data unit is a code block and is a 64/66b code block.

When the data unit is a byte, the first data unit may be an available byte specified in Institute of Electrical and Electronics Engineers (IEEE) 802.3. The 100G Ethernet is used as an example, when transmit control (TXC) is 0, the first data unit is 0x00 to 0xFF. When the transmit control TXC is 1, the first data unit may be 0x00 to 0x05, 0x06, 0x9C, 0xFB, 0xFD, or 0xFE.

Optionally, in some embodiments, when the data unit is a code block, the non-idle data padding unit may be 0x4B+O code. 0x6 may be selected for the O code.

Optionally, in some other embodiments, when the data unit is a byte, the non-idle data padding unit may be a reserved byte specified in IEEE 802.3. For example, when the transmit control TXC is 1, the non-idle data unit may be any one of 0x08 to 0x9B, 0x9D to 0xFA, 0xFC, and 0xFF. 0x08 is used as an example. When determining that a byte is 0x08 (whose binary value is 00001000), the network element device may determine that the byte is a non-idle byte.

In the embodiments of this application, other units or data units than particularly described units or data units (for example, the first unit, the second unit, the first data unit, the first data padding unit, and the second data padding unit) may be any one or more of the first data unit, the first data padding unit, and the second data padding unit.

Figure 3:
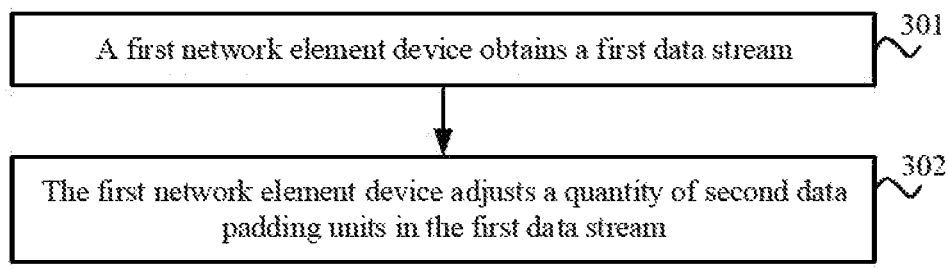
FIG. 3 is a schematic flowchart of a data stream processing method according to an embodiment of this application.

FIG. 3 is a schematic flowchart of a data stream processing method according to an embodiment of this application.

301. A first network element device obtains a first data stream, where the first data stream includes a first data unit and a first data padding unit.

302. The first network element device adjusts a quantity of second data padding units in the first data stream, where a relative position of the first data unit and the first data padding unit in the first data stream is the same as a relative position of the first data unit and the first data padding unit in a second data stream, and the second data stream is an adjusted first data stream.

According to the technical solution, the first network element device can implement rate matching by adjusting the quantity of second data padding units in the first data stream. In other words, when adjusting a rate, the first network element device does not add or delete the first data padding unit in the first data stream. In this way, disorder of the adjusted first data stream to be output can be avoided.

The first data unit is from a client device.

Optionally, in some embodiments, the first data padding unit may be an idle data unit. In this case, the first data padding unit may be from the client device, or may be added by the first network element device.

That the relative positions are the same in this embodiment of this application means that for any data unit (for example, two first data units, two first data padding units, or one first data unit and one first data padding unit), one data unit is always located before the other data unit.

It is assumed that a data unit 1 and a data unit 2 are two data units in the first data stream. The second data stream also includes the data unit 1 and the data unit 2. It is assumed that in the first data stream, the data unit 1 is located before the data unit 2, and in the second data stream, the data unit is also located before the data unit 2. However, in the second data stream, there may be at least one second padding unit between the data unit 1 and the data unit 2.

Figure 4:
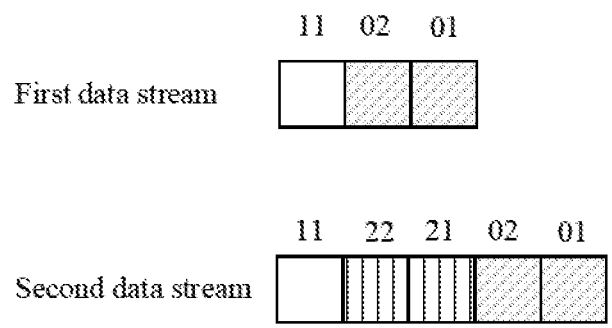
FIG. 4 is a schematic diagram of a first data stream and a second data stream.

FIG. 4 is a schematic diagram of the first data stream and the second data stream. As shown in FIG. 4, the first data stream sequentially includes a first data unit 01, a first data unit 02, and a first data padding unit 11. The second data stream sequentially includes the first data unit 01, the first data unit 02, a second data padding unit 21, a second data padding unit 22, and the first data padding unit 11. It can be learned that, for the first data stream and the second data stream, the first data unit 01 is always located before the first data unit 02 and the first data padding unit 11, and the first data unit 02 is always located before the first data padding unit 11. Therefore, the relative position of the first data unit and the first data padding unit in the first data stream is the same as the relative position of the first data unit and the first data padding unit in the second data stream.

The first data unit and the first data padding unit do not change before and after the first data stream is adjusted. Therefore, it may be understood that, a quantity of first data padding units and a quantity of first data units do not change either.

Optionally, in some embodiments, the first network element device may be an ingress node from which the first data stream enters a network. In this case, before the obtaining, by a first network element device, a first data stream, the method further includes: obtaining, by the first network element device, a third data stream, where the third data stream includes the first data unit and the second data padding unit, and the second data padding unit is an idle data unit; and the obtaining, by a first network element device, a first data stream includes: replacing, by the first network element device the second data padding unit in the third data stream with the first data padding unit, to obtain the first data stream. Based on the foregoing technical solution, an intermediate node in the network may still comply with a rate matching solution in the prior art. In other words, based on the foregoing technical solution, the intermediate node may directly add or delete the idle data unit in the second data stream. In this way, without a need of configuring the intermediate node, disorder of the adjusted first data stream to be output can be avoided only by reconfiguring the ingress node and an egress node in the network.

Optionally, in some embodiments, the first network element device may be the ingress node in the network, or may be the intermediate node in the network.

For example, the first network element device is the ingress node in the network. In this case, the first network element device may add the second padding unit to the first data stream. For another example, the first network element device is an intermediate node in the network, and a previous network element device of the first network element device has deleted all second padding units added by the ingress node in the network. In this case, if a rate at which the first network element device receives the first data stream is greater than a rate at which the first network element device sends the second data stream, the first network element device may further add the second padding unit to the first data stream.

Optionally, in some embodiments, the adjusting, by the first network element device, a quantity of second data padding units in the first data stream includes: adding, by the first network element device, the second data padding unit to the first data stream, where the second data stream includes N consecutive units, K units in the N consecutive units are the second data padding unit, and a unit other than the K units in the N consecutive units is the first data unit or the first data padding unit, K is a positive integer greater than or equal to 1, and N is a positive integer greater than K.

Optionally, in some embodiments, a value of K is preset. For example, the value of K may meet an allowed maximum frequency difference between two nodes in the network. Specifically, K/N may be equal to the maximum frequency difference between two nodes in the network. For example, assuming that the allowed maximum frequency difference between two nodes in the network is 200 millionths and a value of N is 10000, the value of K may be 2.

Optionally, in some embodiments, the K units are K consecutive units.

Optionally, in some embodiments, a plurality of consecutive units (for example, the K consecutive units or the N consecutive units) are a plurality of units that are consecutive in time domain.

Optionally, in some embodiments, the K consecutive units may be K consecutive units located at specified positions in the N consecutive units. For example, in some embodiments, the K consecutive units my be first K units in the N consecutive units. In other words, the K consecutive units are the first unit to a K unit in the N consecutive units. For another example, in some other embodiments, the K consecutive units are last K units in the N consecutive units. In other words, the K consecutive units are an $(N-K+1)^{th}$ unit to an $N^{th}$ unit in the N consecutive units. Certainly, the K consecutive units may be K consecutive units located at other specified positions in the N consecutive units.

Optionally, in some other embodiments, the K units may be K inconsecutive units.

Optionally, in some embodiments, the K inconsecutive units may be located at K specified locations in the N consecutive units. Optionally, in some other embodiments, the K inconsecutive units may alternatively be located at K random positions in the N consecutive units.

Optionally, in some embodiments, the allowed maximum frequency difference between two nodes in the network is an integer. In this case, units included in the second data stream may be divided into a plurality of data unit sets, and each data unit set includes first-type consecutive units. The first-type consecutive units include N consecutive units. The N consecutive units include K second data padding units. A unit other than the K second data padding units in the N consecutive units is the first data unit or the first data padding unit. K is a positive integer greater than or equal to 1, and N is a positive integer greater than K.

Optionally, in some other embodiments, the allowed maximum frequency difference between two nodes in the network may not be an integer. In this case, units included in the second data stream may be divided into a first-type data unit set and the second-type data unit set. Each data unit set in the first-type data unit set may include first-type consecutive units. Each data unit set in the second-type data unit set may include second-type consecutive units. The first-type consecutive units include N consecutive units. The N consecutive units include K' second data padding units. A unit other than the K' second data padding units in the N consecutive units is the first data unit or the first data padding unit. K' is a positive integer greater than or equal to 1, and N is a positive integer greater than K. (K+K')/2N is equal to the allowed maximum frequency difference between two nodes in the network. The two types of data unit sets included in the second data stream may be arranged in order. In other words, a data unit set adjacent to any first-type data unit set in the second data stream is the second-type data unit set. Similarly, a data unit set adjacent to any second-type data unit set in the second data stream is the first-type data unit set.

For example, it is assumed that the allowed maximum frequency difference between two nodes in the network is 150 millionths. In this case, a value of N in the first-type data unit set may be 10000, and a value of K may be 2. A value of N in the second data unit set may be 10000, and a value of K' may be 1.

Optionally, in some embodiments, the first network element device may alternatively be an intermediate node in the network. The first data stream further includes the second data padding unit, and the adjusting, by the first network element device, a quantity of second data padding units in the first data stream includes: adjusting, by the first network element device, the quantity of second data padding units in the first data stream based on a first rate and a second rate, where the first rate is a rate of the first data stream received by the first network element device, and the second rate is a rate at which the first network element device sends the second data stream.

Specifically, when determining that the first rate is less than the second rate, the first network element device may reduce the quantity of second data padding units in the first data stream. When determining that the first rate is greater than the second rate, the first network element device may increase the quantity of second data padding units in the first data stream. When determining that the first rate is equal to the second rate, the first network element device may keep the quantity of second data padding units in the first data stream unchanged.

Optionally, in some embodiments, the first data stream includes a first unit set, the first unit set includes N consecutive units, and the N consecutive units included in the first unit set include $M_1$ second data padding units and $K_1$ first units. The first unit is the first data unit or the first data padding unit, N is a positive integer greater than or equal to 2, $M_1$ and $K_1$ are positive integers greater than or equal to 1, and a sum of $M_1$ and $K_1$ is N. The second data stream includes a second unit set, the second unit set includes N consecutive units, and the N consecutive units included in the second unit set include $M_2$ second data padding units and $K_2$ first units. $M_2$ is a positive integer greater than or equal to 0, $K_2$ is a positive integer greater than or equal to 1, and a sum of $M_2$ and $K_2$ is N. The $K_1$ first units are a subset of the $K_2$ first units, or the $K_2$ first units are a subset of the $K_1$ first units, or the $K_2$ first data units are the same as the $K_1$ first units.

For example, a value of N may be 10000, and a value of $M_1$ may be 1. Correspondingly, a value of $K_1$ is 9999. In this case, a maximum frequency difference allowed for the first network element device to receive the first data stream is 100 millionths. Assuming that the first rate is less than the second rate, and a maximum frequency difference allowed for the first network element device to send the second data stream is 200 millionths, a value of $M_2$ may be 2. In this case, a value of $K_2$ is 9998. The $K_1$ first units are a subset of the $K_2$ first units. One remaining first unit in $K_1$ may be transmitted in next N consecutive units.

For another example, the value of N may be 10000, and the value of $M_1$ may be 1. Correspondingly, the value of $K_1$ is 9999. In this case, the maximum frequency difference allowed for the first network element device to receive the first data stream is 100 millionths. Assuming that the first rate is greater than the second rate, and the maximum frequency difference allowed for the first network element device to send the second data stream is 0, the value of $M_2$ may be 0. In this case, the value of $K_2$ is 10000. The $K_2$ first units are a subset of the $K_1$ first units. One remaining first unit in $K_2$ may be the first first unit in next N consecutive units.

For another example, the value of N may be 10000, and the value of $M_1$ may be 1. In this case, the maximum frequency difference allowed for the first network element device to receive the first data stream is 100 millionths. Assuming that the first rate is equal to the second rate, and the maximum frequency difference allowed for the first network element device to send the second data stream is 100 millionths, a value of $M_2$ may be 1.

Optionally, in some other embodiments, the first data stream includes a first unit set, the first unit set includes N consecutive units, and the $N_1$ consecutive units include $M_1$ second data padding units and K first units. The first unit is the first data unit or the first data padding unit, $N_1$ is a positive integer greater than or equal to 2, $M_1$ and K are positive integers greater than or equal to 1, and a sum of $M_1$ and K is $N_1$. The second data stream includes a second unit set, the second unit set includes $N_2$ consecutive units, and the $N_2$ consecutive units include $M_2$ data padding units and the K first units. $M_2$ is a positive integer greater than or equal to 0, and a sum of $M_2$ and K is $N_2$.

For example, a value of K may be 99970002, and a value of $M_1$ may be 9998. Correspondingly, a value of $N_1$ is 99980000. In this case, a maximum frequency difference allowed for the first network element device to receive the first data stream is 100 millionths. Assuming that the first rate is less than the second rate, and a maximum frequency difference allowed for the first network element device to send the second data stream is 200 millionths, a value of $M_2$ may be 19998. Correspondingly, a value of $N_2$ is 99990000.

For another example, the value of K may be 99970002, and the value of $M_1$ may be 9998. Correspondingly, the value of $N_1$ is 99980000. In this case, the maximum frequency difference allowed for the first network element device to receive the first data stream is 100 millionths. Assuming that the first rate is greater than the second rate, and the maximum frequency difference allowed for the first network element device to send the second data stream is 0, the value of $M_2$ may be 0. In this case, the value of $N_2$ is 99970002.

For another example, the value of K may be 99970002, and the value of $M_1$ may be 9998. Correspondingly, the value of N-1 is 99980000. In this case, the maximum frequency difference allowed for the first network element device to receive the first data stream is 100 millionths. Assuming that the first rate is equal to the second rate, and the maximum frequency difference allowed for the first network element device to send the second data stream is 200 millionths, the value of $M_2$ may be 9998. Correspondingly, the value of $N_2$ is 99970002.

Optionally, in some embodiments, the first network element device may be an ingress node. The first data stream obtained by the first network element device may be one data stream. In other words, the first network element device may obtain a data stream from one client device.

Optionally, in some other embodiments, the first network element device may be an ingress node. The first network element device may multiplex a plurality of data streams as one data stream.

Optionally, in some embodiments, the multiplexing, by the first network element device, S first input data streams as the first data stream includes: obtaining, by the first network element device, second units in the S first input data streams through polling, where the second units include the first data unit and the first data padding unit; and combining, by the first network element device, the obtained second units as the first data stream.

Optionally, in some embodiments, each input data stream in the S first input input streams includes T data unit sets, and the obtaining, by the first network element device, second units in the S first input data streams through polling includes: obtaining, by the first network element device, all second units in P data unit sets in one first input data stream each time, where P is a positive integer greater than or equal to 1.

Figure 5:
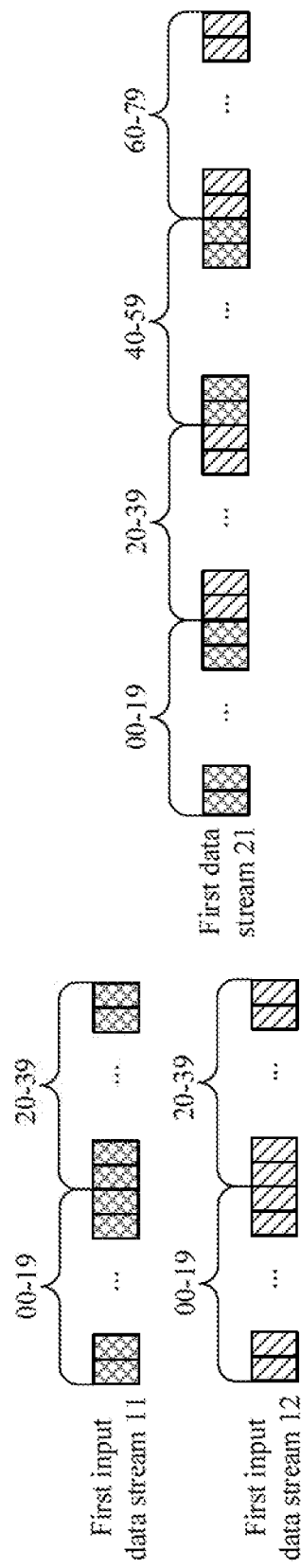
FIG. 5 is a schematic diagram of obtaining second units in S first input data streams in a round of polling and combining the second units as a first data stream.

FIG. 5 is a schematic diagram of obtaining the second units in the S first input data streams in a round of polling and combining the second units as the first data stream. As shown in FIG. 5, two first input data streams are a first input data stream 11 and a first input data stream 12. The first input data stream 11 and the first input data stream 12 are multiplexed as the first data stream 21.

Specifically, FIG. 5 shows two data unit sets included in the first input data stream 11, and each data unit set includes 20 second units. FIG. 5 shows two data unit sets included in the first input data stream 12, and each data unit set includes 20 second units.

The first network element device may first obtain all second units in a first data unit set in the first input data stream 11: second units 00 to 19 in the first input data stream 11. The second units 00 to 19 in the first input data stream 11 are second units 00 to 19 in the first data stream 21.

Then, the first network element device may obtain all second units in a first data unit set in the first input data stream 12: second units 00 to 19 in the first input data stream 11. The second units 00 to 19 in the first input data stream 12 are second units 20 to 39 in the first data stream 21.

Then, the first network element device may obtain all second units in a second data unit set in the first input data stream 11: second units 20 to 39 in the first input data stream 11. The second units 20 to 39 in the first input data stream 11 are second units 40 to 59 in the first data stream 21.

Then, the first network element device may obtain all second units in a second data unit set in the first input data stream 12: second units 20 to 39 in the first input data stream 12. The second units 20 to 39 in the first input data stream 12 are second units 60 to 79 in the first data stream 21.

It may be understood that a quantity of second units and a quantity of data unit sets in the embodiment shown in FIG. 5 are merely intended to help a person skilled in the art better understand the technical solution in this application, but not to limit the quantity of second units and the quantity of data unit sets.

Optionally, in some embodiments, the obtaining, by the first network element device, second units in the S first input data streams through polling includes: obtaining, by the first network element device, Q second units in one first input data stream each time, where Q is a positive integer greater than or equal to 1.

Figure 6:
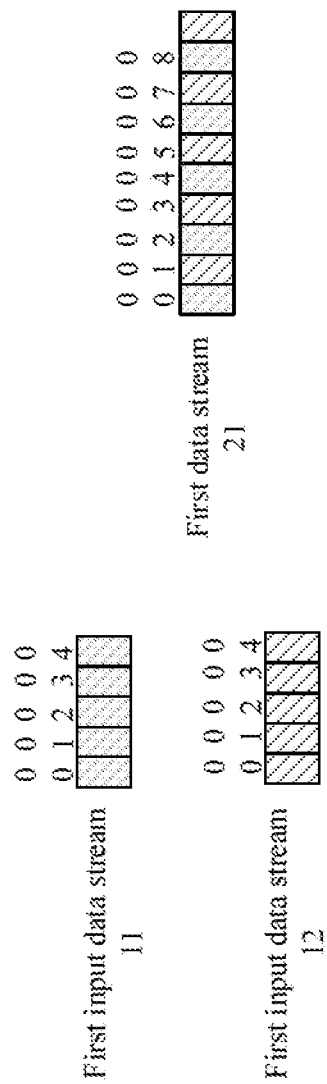
FIG. 6 is a schematic diagram of obtaining second units in S first input data streams in a round of polling and combining the second units as a first data stream.

FIG. 6 is a schematic diagram of obtaining the second units in the S first input data streams in a round of polling and combining the second units as the first data stream. As shown in FIG. 6, two first input data streams are a first input data stream 11 and a first input data stream 12. The first input data stream 11 and the first input data stream 12 are multiplexed as the first data stream 21.

Specifically, FIG. 6 shows that the first input data stream 11 includes five second units. FIG. 6 shows that the first input data stream 12 includes five second units.

The first network element device may first obtain the first second unit in the first input data stream 11: a second unit 00 in the first input data stream 11. The second unit 00 in the first input data stream 11 is a second unit 00 in the first data stream 21.

Then, the first network element device may obtain the first second unit in the first input data stream 12: a second unit 00 in the second input data stream 12. The second unit 00 in the first input data stream 12 is a second unit 01 in the first data stream 21.

Then, the first network element device may obtain the second second unit in the first input data stream 11: a second unit 01 in the first input data stream 11. The second unit 01 in the first input data stream 11 is a second unit 02 in the first data stream 21.

Then, the first network element device may obtain the second second unit in the first input data stream 12: a second unit 01 in the first input data stream 12. The second unit 01 in the first input data stream 12 is a second unit 03 in the first data stream 21. By analogy, the first network element device may multiplex the first input data stream 11 and the first input data stream 12 as the first data stream 21.

It may be understood that a quantity of second units in the embodiment shown in FIG. 6 is merely intended to help a person skilled in the art better understand the technical solution in this application, but not to limit the quantity of second units.

For ease of description, a manner (for example, the manner shown in FIG. 5) of polling the S first input data streams by using a data unit set as a unit to obtain the first data stream is referred to as a first polling mode below, in which the S first input data streams are multiplexed as the first data stream. A manner (for example, the manner shown in FIG. 6) of polling the S first input data streams by using a second unit as a unit to obtain the first data stream is referred to as a second polling mode below, in which the S first input data streams are multiplexed as the first data stream.

Optionally, in some embodiments, the first network element device obtains first input data streams, where at least one of the S first input data streams includes a first data unit and an idle data unit. The first network element device multiplexes the first data units in data streams in the S first input data streams as the first data stream, and S is a positive integer greater than or equal to 2. Based on the foregoing technical solution, when multiplexing the S first input data streams as the first data stream, the first network element device multiplexes only the first data units in the S first input data streams as the first data stream. In other words, when multiplexing the S first input data streams as the first data stream, the first network element device multiplexes the first data units in the first input data streams and deletes the idle data units.

Optionally, in some embodiments, the S first input data streams may be input data streams of a same client device group.

When multiplexing the first data units in the S first input data streams as the first data stream, the first network element device may alternatively multiplex the first data units in the S first input data streams as the first data stream in the first polling mode or the second polling mode.

Figure 15:
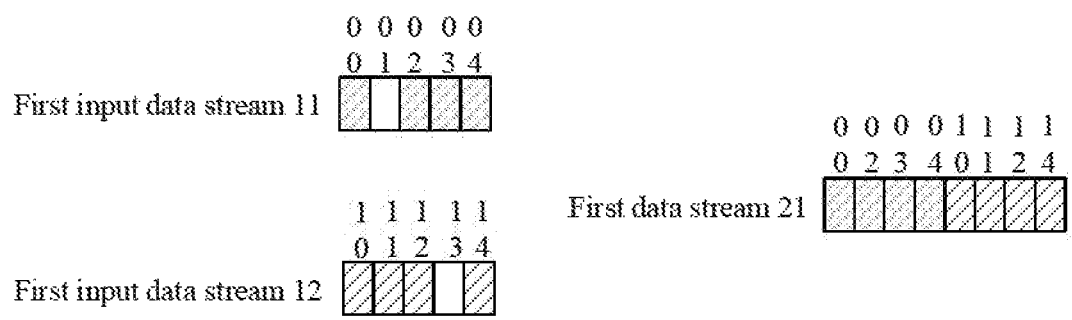
FIG. 15 is a schematic diagram of obtaining first data units in S first input data streams in around of polling and combining the first data units as a first data stream.

FIG. 15 is a schematic diagram of obtaining the first data units in the S first input data streams in a round of polling and combining the first data units as the first data stream. As shown in FIG. 15, two first input data streams are a first input data stream 11 and a first input data stream 12. The first input data stream 11 and the first input data stream 12 are multiplexed as the first data stream 21.

Specifically. FIG. 15 shows that the first input data stream 11 includes one data unit set, and the data unit set includes five data units. The five data units are a data unit 00, a data unit 01, a data unit 02, a data unit 03, and a data unit 04. FIG. 15 shows that the second input data stream 12 includes one data unit set, and the data unit set includes five data units. The five data units are a data unit 10, a data unit 11, a data unit 12, a data unit 13, and a data unit 14. The data unit 01 and the data unit 13 are idle data units.

The first network element device may first obtain the data unit 00, the data unit 02, the data unit 03, and the data unit 04 in the first input data stream 11.

Then, the first network element device may obtain the data unit 10, the data unit 11, the data unit 12, and the data unit 14 in the first input data stream 12.

In this way, the first network element device may multiplex the first input data stream 11 and the first input data stream 12 as the first data stream 21 in the first polling mode.

It may be understood that a quantity of first data units and a quantity of data unit sets in the embodiment shown in FIG. 15 are merely intended to help a person skilled in the art better understand the technical solution in this application, but not to limit the quantity of first data units and the quantity of data unit sets.

Figure 16:
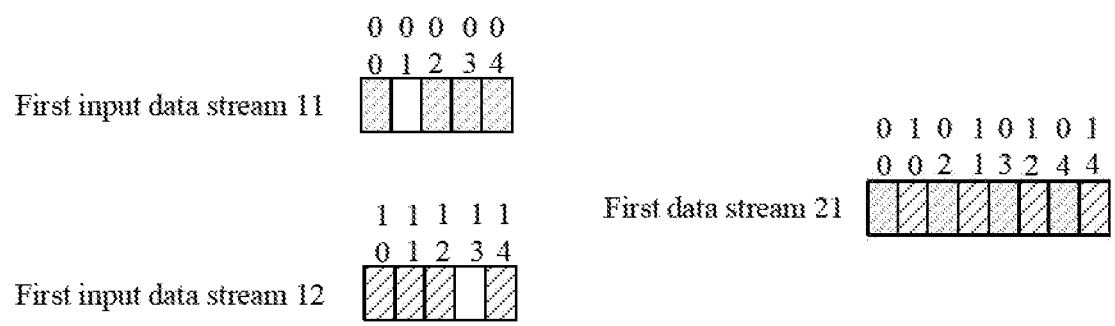
FIG. 16 is a schematic diagram of obtaining first data units in S first input data streams in around of polling and combining the first data units as a first data stream.

FIG. 16 is a schematic diagram of obtaining the first data units in the S first input data streams in a round of polling and combining the first data units as the first data stream. As shown in FIG. 16, two first input data streams are a first input data stream 11 and a first input data stream 12. The first input data stream 11 and the first input data stream 12 are multiplexed as the first data stream 21.

Specifically, FIG. 16 shows that the first input data stream 1 includes five data units. The five data units are a data unit 00, a data unit 01, a data unit 02, a data unit 03, and a data unit 04. FIG. 15 shows that the second input data stream 12 includes five data units. The five data units are a data unit 10, a data unit 11, a data unit 12, a data unit 13, and a data unit 14. The data unit 01 and the data unit 13 are idle data units.

The first network element device may first obtain the data unit 00 in the first input data stream 11, then obtain the data unit 10 in the second input data stream 12, then obtain the data unit 02 in the first input data stream 11, then obtain the data unit 11 in the second input data stream 12, then obtain the data unit 03 in the first input data stream 11, then obtain the data unit 12 in the second input data stream 12, then obtain the data unit 04 in the first input data stream 11, and then obtain the data unit 14 in the second input data stream 12.

In this way, the first network element device may multiplex the first input data stream 11 and the first input data stream 12 as the first data stream 21 in the second polling mode.

It may be understood that a quantity of first data padding units in the embodiment shown in FIG. 16 is merely intended to help a person skilled in the at better understand the technical solution in this application, but not to limit the quantity of first data padding units.

The first data stream may further include indication information and the indication information is used to indicate a polling mode used by the first network element device. The indication information may further indicate an input data stream corresponding to each data unit. A network element device performing demultiplexing may restore the first data stream to the S data streams according to the indication information.

Optionally, in some embodiments, the obtaining, by the first network element device, S first input data streams includes: obtaining, by the first network element device, S second input data streams, where each of the S second input data streams includes the first data unit and the second data padding unit, and the second data padding unit is an idle data unit; and replacing, by the first network element device, the second data padding unit in each of the S second input data streams with the first data padding unit, to obtain the S first input data streams. Based on the foregoing technical solution, the intermediate node in the network may still comply with the rate matching solution in the prior art. In other words, based on the foregoing technical solution, the intermediate node may directly add or delete the idle data unit in the second data stream. In this way, without a need of configuring the intermediate node, disorder of the adjusted first data stream to be output can be avoided only by reconfiguring an ingress node and an egress node in the network.

Optionally, in some embodiments, the first data stream obtained after the S first input data streams are multiplexed may be a serial data stream. For example, the first data streams shown in FIG. 5 and FIG. 6 are serial data streams.

Optionally, in some other embodiments, the first data stream obtained after the S first input data streams are multiplexed may be a parallel data stream.

Figure 7:
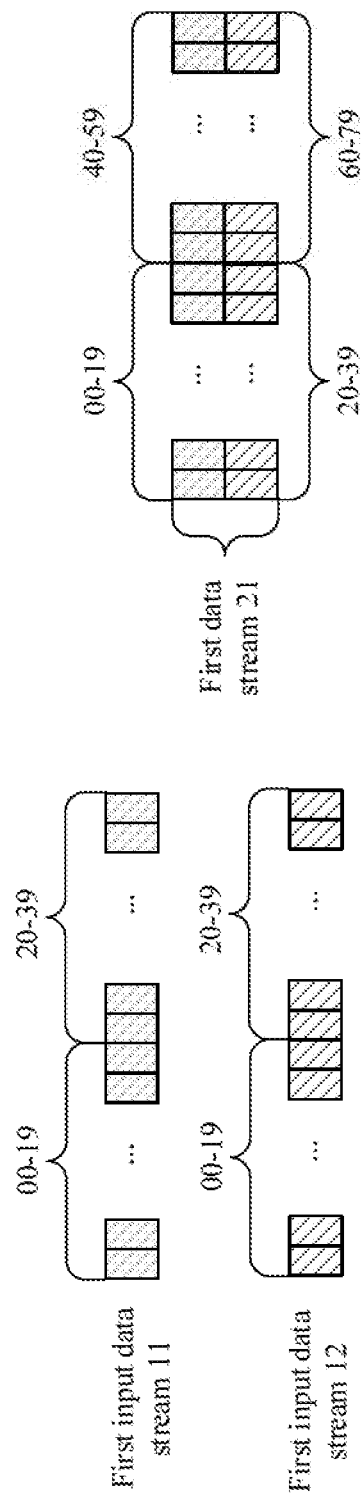
FIG. 7 is a schematic diagram of a first data stream according to an embodiment of this application.

FIG. 7 is a schematic flowchart of a type of first data stream according to an embodiment of this application. The two first input data streams in FIG. 5 are still used as an example. The first data stream in FIG. 7 is a parallel data stream. As shown in FIG. 7, second units 00 to 19 in a first data stream 21 are parallel to second units 20 to 39 in the first data stream 21. Second units 40 to 59 in the first data stream 21 are parallel to second units 60 to 79 in the first data stream 21. The second units 00 to 19 in the first data stream 2I in FIG. 7 are the second units 00 to 19 in the first input data stream 11. The second units 20 to 39 in the first data stream 21 are the second units 00 to 19 in the first input data stream 12. The second units 40 to 59 in the first data stream 21 are the second units 20 to 39 in the first input data stream 11. The second units 60 to 79 in the first data stream 21 are the second units 20 to 39 in the first input data stream 11.

Optionally, in some embodiments, the multiplexing, by the first network element device, the S first input data streams, as the first data stream includes: obtaining, by the first network element device, the first data unit in each data stream in the S first input data streams, and combines the first data units of the S first input data streams as the first data stream. In other words, when multiplexing the S first data streams as the first data stream, the first network element device skips an idle data unit, and multiplexes only the first data units in the S first input data streams as the first data stream. A multiplexing manner in which the first network element device skips the idle data unit and multiplexes the S first input data streams is the same as a manner in which the first network element device multiplexes all data units in the S first input data streams as the first data stream, and details are not described herein again. Based on the foregoing technical solution, the first data stream does not include the idle data unit. Therefore, a problem of disorder caused by adding or deleting an idle data unit does not occur. In this case, the ingress node may directly add an idle data unit for rate adjustment. Alternatively, the intermediate node in the network may directly add or delete the idle data unit. The egress node in the network may directly delete the idle data unit.

Optionally, in some embodiments, the S first input data streams may be input data streams of a same user group.

Optionally, in some embodiments, the second data stream may further include a user data unit. The user data unit is used to carry one or more of user information, operation, administration, and maintenance (MOA) information, and automatic protection switching (APS) protocol information. The user information includes one or more of a user group identifier, a user identifier, and user sequence information, and the user sequence information is used to indicate a time sequence of at least one user included in the user group in the user group. In this way, each node in the network may maintain and manage the data unit in the data stream by using the foregoing information.

Figure 8:
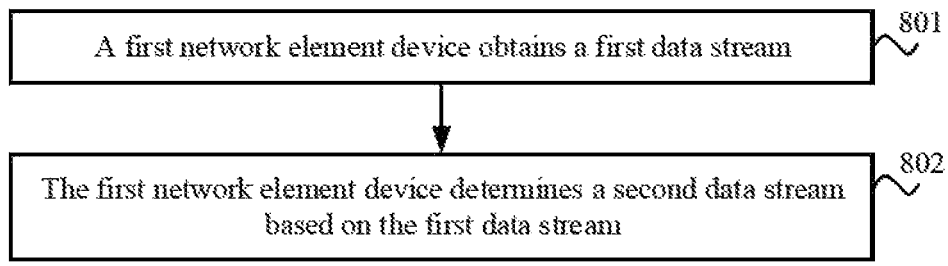
FIG. 8 is a schematic flowchart of another data stream processing method according to an embodiment of this application.

FIG. 8 is a schematic flowchart of another data stream processing method according to an embodiment of this application.

801: A first network element device obtains a first data stream, where the first data stream includes a first data unit, a first data padding unit, and a second data padding unit.

802. The first network element device determines a second data stream based on the first data stream, where the second data stream includes the first data unit and the first data padding unit, and a relative position of the first data unit and the first data padding unit in the first data stream is the same as a relative position of the first data unit and the first data padding unit in the second data stream.

According to the technical solution, it can be avoided that a data unit in a data stream input to a network and a data unit output by the network are in disorder.

The first network element device in the embodiment shown in FIG. 8 may be an egress node in the network. According to the method in FIG. 8, the first data stream determined by the first network element device is the same as the data stream input to the network.

The first data unit is from a client device.

Optionally, in some embodiments, the determining, by the first network element device, a second data stream based on the first data stream includes: obtaining, by the first network element device, the first data padding unit and the first data unit in the first data stream, and determining the second data stream. The first data padding unit may be an idle data unit. In other words, when obtaining the second data stream, the first network element device may skip the second data padding unit, and obtain only the first data padding unit and the first data unit in the first data stream.

Optionally, in some other embodiments, the determining, by the first network element device, a second data stream based on the first data stream includes: obtaining, by the first network element device, the first data unit and the second data padding unit in the first data stream; and replacing, by the first network element device, the second data padding unit with the first data padding unit, to obtain the second data stream, where the first data padding unit is an idle data unit. Based on the foregoing technical solution, an intermediate node in the network may still comply with a rate matching solution in the prior art. In other words, based on the foregoing technical solution, the intermediate node may directly add or delete the idle data unit in the obtained data stream. In this way, without a need of configuring the intermediate node, disorder of the adjusted first data stream to be output can be avoided only by reconfiguring an ingress node and an egress node in the network.

Optionally, in some embodiments, the method further includes: demultiplexing, by the first network element device, the second data stream as S first output data streams, and outputting the S first output data streams.

Optionally, in some embodiments, the determining, by the first network element device, a second data stream based on the first data stream includes: obtaining, by the first network element device, the first data unit and the second data padding unit in the first data stream, and determining the second data stream. The method further includes: demultiplexing, by the first network element device, the first data stream as S second output data streams; and replacing, by the first network element device, the second data padding unit in each output data stream in the S pieces of second output data with the first data padding unit, to obtain S first output data streams, where the first data padding unit is an idle data unit; and outputting, by the first network element device, the S first output data streams. Based on the foregoing technical solution, the intermediate node in the network may still comply with the rate matching solution in the prior art. In other words, based on the foregoing technical solution, the intermediate node may directly add or delete the idle data unit in the obtained data stream. In this way, without a need of configuring the intermediate node, disorder of the adjusted first data stream to be output can be avoided only by reconfiguring an ingress node and an egress node in the network.

It may be understood that the first network element device in FIG. 8 and the first network element device in FIG. 2 are different network element devices. The first network element device in FIG. 2 is the ingress node or the intermediate node in the network. The second network element device shown in FIG. 8 is the egress node in the network. For ease of description, the egress node may be used to represent the first network element device in FIG. 8, and the ingress node may be used to represent the first network element device in FIG. 2. The ingress node may indicate a polling mode to the egress node. For example, the ingress node may indicate the polling mode to the egress node by using an overhead (Overhead, Ohio) in a data stream. For another example, the ingress node may indicate the polling mode to the egress node by using another data unit in the data stream. For another example, the ingress node and the egress node may be preconfigured to use one of the two polling modes.

For example, the ingress node may indicate, by using the overhead, that the ingress node multiplexes the S first input data streams as the first data stream in the first polling mode. In this case, the egress node may correspondingly demultiplex the obtained second data stream as the S first output data streams. More specifically, the ingress node may further indicate, by using the OH, an input data stream corresponding to each unit in the second data stream. For example, the ingress node may indicate that the $00^{th}$ to $19^{th}$ units in the second data stream correspond to a first input data stream 11, the $20^{th}$ to $39^{th}$ units correspond to a first input data stream 12, the $40^{th}$ to $59^{th}$ units correspond to the first input data stream 11, and the $60^{th}$ to $79^{th}$ units correspond to the first input data stream 12, and so on. In this way, when demultiplexing the second data stream, the egress node may demultiplex the second data stream as the S first output data streams according to an indication of the ingress node. The ingress node may indicate, in a plurality of manners, an input data stream corresponding to each unit in the second data stream. For example, the ingress node may directly indicate the input data stream corresponding to each unit. In this way, the egress node may directly determine an input data stream corresponding to each unit in the second data stream. For another example, the ingress node may indicate the first unit corresponding to a first input data stream and a length of consecutive units. In this way, the egress node may determine, based on information indicated by the ingress node, the input data stream corresponding to each unit. For another example, the ingress node may indicate the first unit obtained when the first input data stream is obtained through polling, a length of units obtained in each round of polling, and a quantity of first input data streams for which polling is performed. In this way, the egress node may determine, based on information indicated by the ingress node, the input data stream corresponding to each unit. After determining the input data stream corresponding to each unit, the egress node may demultiplex the second data stream as the S first output data streams.

Similarly, the ingress node may indicate, by using the overhead, that the ingress node multiplexes the S first input data streams as the first data stream in the second polling mode. In this case, the egress node may correspondingly demultiplex the obtained second data stream as the S first output data streams.

Figure 9:
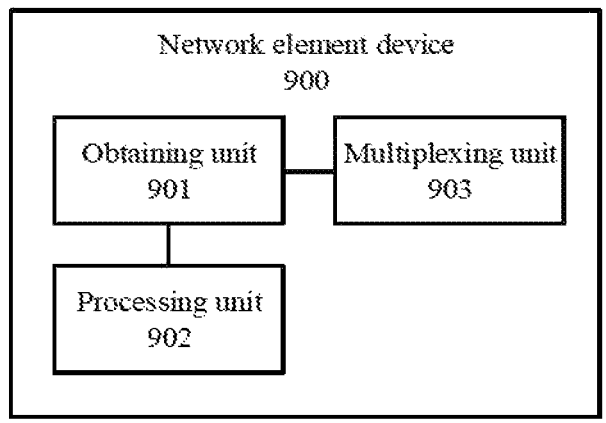
FIG. 9 is a structural block diagram of a network element device according to an embodiment of this application.

FIG. 9 is a structural block diagram of a network element device according to an embodiment of this application. As shown in FIG. 9, the network element device 900 includes an obtaining unit 901 and a processing unit 902. The network element device 900 may perform steps performed by the first network element device in the embodiment shown in FIG. 3.

The obtaining unit 901 is configured to obtain a first data stream. The first data stream includes a first data unit and a first data padding unit.

The processing unit 902 is configured to adjust a quantity of second data padding units in the first data stream. A relative position of the first data unit and the first data padding unit in the first data stream is the same as a relative position of the first data unit and the first data padding unit in a second data stream, and the second data stream is an adjusted first data stream.

Optionally, in some embodiments, the obtaining unit 901 is further configured to obtain a third data stream. The third data stream includes the first data unit and the second data padding unit, and the second data padding unit is an idle data unit. The obtaining unit 901 is further configured to replace the second data padding unit in the third data stream with the first data padding unit, to obtain the first data stream.

Optionally, in some embodiments, the processing unit 902 is specifically configured to add the second data padding unit to the first data stream. The second data stream includes N consecutive units, K consecutive units in the N consecutive units are the second data padding unit, a unit other than the K consecutive units in the N consecutive units is the first data unit or the first data padding unit, K is a positive integer greater than or equal to 1, and N is a positive integer greater than K.

Optionally, in some embodiments, the first data stream further includes the second data padding unit, and the processing unit 902 is specifically configured to adjust the quantity of second data padding units in the first data stream based on a first rate and a second rate. The first rate is a rate of the first data stream received by the first network element device, and the second rate is a rate at which the first network element device sends the second data stream.

Optionally, in some embodiments, the first data stream includes a first unit set, the first unit set includes N consecutive units, the N consecutive units included in the first unit set include $M_1$ second data padding units and $K_1$ first units, the first unit is the first data unit or the first data padding unit, N is a positive integer greater than or equal to 2, $M_1$ and $K_1$ are positive integers greater than or equal to 1, and a sum of $M_1$ and $K_1$ is N. The second data stream includes a second unit set, the second unit set includes N consecutive nits, the N consecutive units included in the second unit set include $M_2$ second data padding units and $K_2$ first units, $M_2$ is a positive integer greater than or equal to 0, $K_2$ is a positive integer greater than or equal to 1, and a sum of $M_2$ and $K_2$ is N. The $K_1$ first units are a subset of the $K_2$ first units, or the $K_2$ first units are a subset of the $K_1$ first units, or the $K_2$ first data units are the same as the $K_1$ first units.

Optionally, in some embodiments, the first data stream includes a first unit set, the first unit set includes $N_1$ consecutive units, the $N_1$ consecutive units include $M_1$ second data padding units and K first units, the first unit is the first data unit or the first data padding unit, $N_1$ is a positive integer greater than or equal to 2, $M_1$ and K are positive integers greater than or equal to 1, and a sum of $M_1$ and K is $N_1$. The second data stream includes a second unit set, the second unit set includes $N_2$ consecutive units, the $N_2$ consecutive units include $M_2$ data padding units and K first units. $M_2$ is a positive integer greater than or equal to 0, and a sum of $M_2$ and K is $N_2$.

Optionally, in some embodiments, the network element device 900 may further include a multiplexing unit 903, configured to: obtain S first input data streams, and multiplex the S first input data streams as the first data stream, where S is a positive integer greater than or equal to 2.

Optionally, in some embodiments, the multiplexing unit 903 is specifically configured to obtain second units in the S first input data streams through polling, and combine the obtained second units as the first data stream, where the second units include the first data unit and the first data padding unit.

Optionally, in some embodiments, each input data stream in the S first input input streams includes T data unit sets, and the multiplexing unit 903 is specifically configured to obtain all second units in P data unit sets in one first input data stream each time, where P is a positive integer greater than or equal to 1.

Optionally, in some embodiments, the multiplexing unit 903 is specifically configured to obtain Q second units in one first input data stream each time, where Q is a positive integer greater than or equal to 1.

Optionally, in some embodiments, the multiplexing unit 903 is specifically configured to: obtain S second input data streams, and replace a second data padding unit in each of the S second input data streams with the first data padding unit, to obtain the S first input data streams, where each of the S second input data streams includes the first data unit and the second data padding unit, and the second data padding unit is an idle data unit.

For specific functions and beneficial effects of the obtaining unit 901, the processing units 902, and the multiplexing unit 903, refer to the embodiment shown in FIG. 3. Details are not described herein again.

Figure 10:
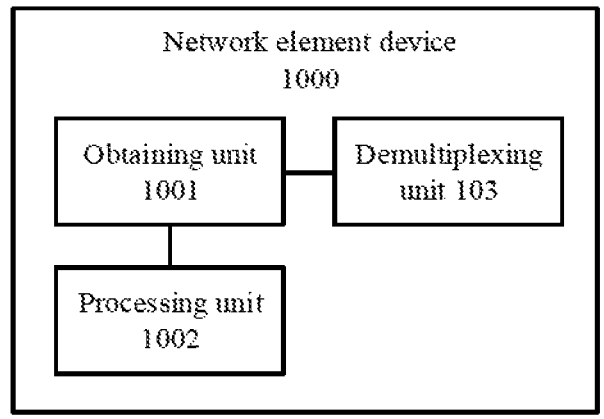
FIG. 10 is a structural block diagram of a network element device according to an embodiment of this application.

FIG. 10 is a structural block diagram of a network element device according to an embodiment of this application. As shown in FIG. 10, the network element device 1000 includes an obtaining unit 1001 and a processing unit 1002. The network element device 1000 may perform steps performed by the first network element device in the embodiment shown in FIG. 8.

The obtaining unit 1001 is configured to obtain a first data stream, where the first data stream includes a first data unit, a first data padding unit, and a second data padding unit.

The processing unit 1002 is configured to determine a second data stream based on the first data stream, where the second data stream includes the first data unit and the first data padding unit, and a relative position of the first data unit and the first data padding unit in the first data stream is the same as a relative position of the first data unit and the first data padding unit in the second data stream.

Optionally, in some embodiments, the processing unit 1002 is specifically configured to: obtain the first data unit and the second data padding unit in the first data stream, and replace the second data padding unit with the first data padding unit to obtain the second data stream, where the first data padding unit is an idle data unit.

Optionally, in some embodiments, the network element device 1000 may further include a demultiplexing unit 1003, configured to: demultiplex the second data stream as S first output data streams, and output the S first output data streams, where S is a positive integer greater than or equal to 2. Optionally, in some embodiments, the processing unit 1002 is specifically configured to: obtain the first data padding unit and the first data unit in the first data stream, and determine the second data stream.

Optionally, in some embodiments, the processing unit 1002 is specifically configured to: obtain the first data unit and the second data padding unit in the first data stream, and determine the second data stream. The network element device further includes a demultiplexing unit 1003, configured to: demultiplex the first data stream as S second output data streams, replace the second data padding unit in each output data stream in the S pieces of second output data with the first data padding unit, to obtain S first output data streams, and output the S first output data streams, where the first data padding unit is an idle data unit, and S is a positive integer greater than or equal to 2.

For specific functions and beneficial effects of the obtaining unit 1001, the processing units 1002, and the demultiplexing unit 1003, refer to the embodiment shown in FIG. 8. Details are not described herein again.

Figure 11:
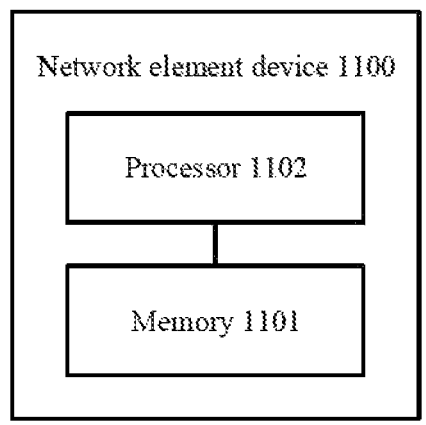
FIG. 11 is a structural block diagram of another network element device according to an embodiment of this application.

FIG. 11 is a structural block diagram of another network element device according to an embodiment of this application. The network element device 1100 in FIG. 11 includes a memory 1101 and a processor 1102.

The memory 1101 is configured to store a program.

The processor 1102 is configured to execute the program stored in the memory 1101, and when the program is executed, the network element device 1100 is enabled to implement the method provided in the embodiment in FIG. 3.

The network element device 1100 may be used to implement some or all of the method in FIG. 3 by using software.

The memory 1101 may be a physically independent unit, or may be integrated with the processor 1102.

Optionally, when some or all of the method in FIG. 3 is implemented by using software, the network element device 1100 may alternatively include only the processor 1102. The memory 1101 configured to store the program is located outside the apparatus 1100. The processor 1102 is connected to the memory 1101 through a circuit/an electric wire, and is configured to read and execute the program stored in the memory 1101.

The processor 1102 may be a central processing unit (CPU), a network processor (NP), or a combination of a CPU and an NP.

The processor 1102 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof The memory 1101 may include a volatile memory, such as a random access memory (RAM); or the memory 1101 may include a non-volatile memory, such as a flash memory, a hard disk drive (HDD), or a solid-state drive (SSD); or the memory 1101 may include a combination of the foregoing types of memories.

Figure 12:
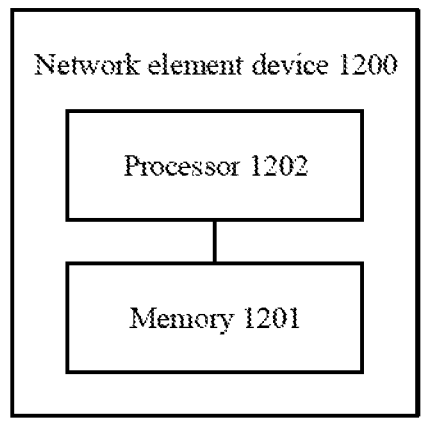
FIG. 12 is a structural block diagram of another network element device according to an embodiment of this application.

FIG. 12 is a structural block diagram of another network element device according to an embodiment of this application. The network element device 1200 in FIG. 12 includes a memory 1201 and a processor 1202.

The memory 1201 is configured to store a program.

The processor 1202 is configured to execute the program stored in the memory 1201, and when the program is executed, the network element device 1200 is enabled to implement the method provided in the embodiment in FIG. 8.

The network element device 1200 may be used to implement some or all of the method in FIG. 8 by using software.

The memory 1201 may be a physically independent unit, or may be integrated with the processor 1202.

Optionally, when some or all of the method in FIG. 8 is implemented by using software, the network element device 1200 may alternatively include only the processor 1202. The memory 1201 configured to store the program is located outside the apparatus 1200. The processor 1202 is connected to the memory 1201 through a circuit/an electric wire, and is configured to read and execute the program stored in the memory 1201.

The processor 1202 may be a central processing unit (CPU), a network processor (NP), or a combination of a CPU and an NP.

The processor 1202 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The memory 1201 may include a volatile memory, such as a random access memory (RAM); or the memory 1201 may include a non-volatile memory, such as a flash memory, a hard disk drive (HDD), or a solid-state drive (SSD); or the memory 1201 may include a combination of the foregoing types of memories.

Another aspect of this application provides a computer-readable storage medium. The computer-readable storage medium stores an instruction, and when the instruction is run on a computer, the computer is enabled to perform the method shown in FIG. 3.

Another aspect of this application provides a computer program product including an instruction, and when the computer program product is run on a computer, the computer is enabled to perform the method in FIG. 3.

Another aspect of this application provides a computer-readable storage medium. The computer-readable storage medium stores an instruction, and when the instruction is run on a computer, the computer is enabled to perform the method in FIG. 8.

Another aspect of this application provides a computer program product including an instruction, and when the computer program product is run on a computer, the computer is enabled to perform the method shown in FIG. 8.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate pats may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the various embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or the part of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data stream processing method, comprising:
obtaining, by a first network element device, a first data stream, wherein the first data stream comprises a first data unit, a first data padding unit, and a second data padding unit; and
adjusting, by the first network element device, a quantity of the second data padding unit in the first data stream based on a first rate and a second rate, the first rate being a rate for the first network element device to receive the first data stream, and the second rate being a rate at which the first network element device sends a second data stream, wherein a relative position of the first data unit and the first data padding unit in the first data stream is the same as a relative position of the first data unit and the first data padding unit in the second data stream, and the second data stream is an adjusted first data stream.

2. The method according to claim 1,
wherein the method further comprises, before the obtaining of the first data stream, obtaining, by the first network element device, a third data stream, wherein the third data stream comprises the first data unit and the second data padding unit, and the second data padding unit is an idle data unit, and
wherein the obtaining of the first data stream comprises replacing, by the first network element device, the second data padding unit in the third data stream with the first data padding unit, to obtain the first data stream.

3. The method according to claim 1, wherein the second data stream comprises N consecutive units, K consecutive units in the N consecutive units are the second data padding unit, a unit other than the K consecutive units in the N consecutive units is the first data unit or the first data padding unit, K is a positive integer greater than or equal to 1, and N is a positive integer greater than K.

4. The method according to claim 1,
wherein the first data stream comprises a first unit set, the first unit set comprises N consecutive units, the N consecutive units in the first unit set comprise $M_1$ second data padding units and $K_1$ first units, the first unit is the first data unit or the first data padding unit, N is a positive integer greater than or equal to 2, $M_1$ and $K_1$ are positive integers greater than or equal to 1, and a sum of $M_1$ and $K_1$ is N,
wherein the second data stream comprises a second unit set, the second unit set comprises N consecutive units, the N consecutive units in the second unit set comprise $M_2$ second data padding units and $K_2$ first units, $M_2$ is a positive integer greater than or equal to 0, $K_2$ is a positive integer greater than or equal to 1, and a sum of $M_2$ and $K_2$ is N, and wherein the $K_1$ first units are a subset of the $K_2$ first units, or the $K_2$ first units are a subset of the $K_1$ first units, or the $K_2$ first data units are the same as the $K_1$ first units.

5. The method according to claim 1,
wherein the first data stream comprises a first unit set, the first unit set comprises $N_1$ consecutive units, the $N_1$ consecutive units comprise $M_1$ second data padding units and K first units, the first unit is the first data unit or the first data padding unit, Ni is a positive integer greater than or equal to 2, $M_1$ and K are positive integers greater than or equal to 1, and a sum of $M_1$ and K is $N_1$, and
wherein the second data stream comprises a second unit set, the second unit set comprises $N_2$ consecutive units, the $N_2$ consecutive units comprise $M_2$ data padding units and K first units, $M_2$ is a positive integer greater than or equal to 0, and a sum of $M_2$ and K is $N_2$.

6. The method according to claim 1, wherein the obtaining of the first data stream comprises:
obtaining, by the first network element device, S first input data streams, wherein S is a positive integer greater than or equal to 2; and
multiplexing, by the first network element device, the S first input data streams as the first data stream.

7. The method according to claim 6, wherein the multiplexing of the S first input data streams as the first data stream comprises:
obtaining, by the first network element device, second units in the S first input data streams through polling, wherein the second units comprise the first data unit and the first data padding unit; and
combining, by the first network element device, the obtained second units as the first data stream.

8. The method according to claim 7,
wherein each of the S first input data streams comprises T data unit sets, and
wherein the obtaining of the second units in the S first input data streams through polling comprises obtaining, by the first network element device, all second units in P data unit sets in one first input data stream each time, wherein P is a positive integer greater than or equal to 1.

9. The method according to claim 7, wherein the obtaining of the second units in the S first input data streams through polling comprises obtaining, by the first network element device, Q second units in one first input data stream each time, wherein Q is a positive integer greater than or equal to 1.

10. The method according to claim 6, wherein the obtaining of the S first input data streams comprises:
obtaining, by the first network element device, S second input data streams, wherein each of the S second input data streams comprises the first data unit and the second data padding unit, and the second data padding unit is an idle data unit; and
replacing, by the first network element device, the second data padding unit in each of the S second input data streams with the first data padding unit, to obtain the S first input data streams.

11. A data stream processing method, comprising:
obtaining, by a first network element device, a first data stream, wherein the first data stream comprises a first data unit, a first data padding unit, and a second data padding unit; and determining, by the first network element device, a second data stream by replacing the second data padding unit with the first data padding unit, to obtain the second data stream, wherein the first data padding unit is an idle data unit, and wherein the second data stream comprises the first data unit and the first data padding unit, and a relative position of the first data unit and the first data padding unit in the first data stream is the same as a relative position of the first data unit and the first data padding unit in the second data stream.

12. The method according to claim 11, wherein the determining of the second data stream based on the first data stream comprises obtaining, by the first network element device, the first data padding unit and the first data unit in the first data stream, and determining the second data stream.

13. The method according to claim 11, further comprising demultiplexing, by the first network element device, the second data stream as S first output data streams, and outputting the S first output data streams, wherein S is a positive integer greater than or equal to 2.

14. The method according to claim 11, wherein the determining of the second data stream based on the first data stream comprises obtaining, by the first network element device, the first data unit and the second data padding unit in the first data stream, and determining the second data stream, and wherein the method further comprises:
demultiplexing, by the first network element device, the first data stream as S second output data streams;
replacing, by the first network element device, the second data padding unit in each of the S second output data streams with the first data padding unit, to obtain S first output data streams, wherein the first data padding unit is an idle data unit; and
outputting, by the first network element device, the S first output data streams, wherein S is a positive integer greater than or equal to 2.

15. A network element device, comprising:
an obtaining unit, configured to obtain a first data stream, wherein the first data stream comprises a first data unit, a first data padding unit, and a second data padding unit; and
a processing unit, configured to adjust a quantity of the second data padding unit in the first data stream based on a first rate and a second rate, the first rate being a rate for the first network element device to receive the first data stream, and the second rate being a rate at which the first network element device sends a second data stream, wherein a relative position of the first data unit and the first data padding unit in the first data stream is the same as a relative position of the first data unit and the first data padding unit in the second data stream, and the second data stream is an adjusted first data stream.

16. The network element device according to claim 15,
wherein the obtaining unit is further configured to obtain a third data stream, the third data stream comprises the first data unit and the second data padding unit, and the second data padding unit is an idle data unit, and
wherein the obtaining unit is further configured to replace the second data padding unit in the third data stream with the first data padding unit, to obtain the first data stream.

17. The network element device according to claim 15, wherein the second data stream comprises N consecutive units, K consecutive units in the N consecutive units are the second data padding unit, a unit other than the K consecutive units in the N consecutive units is the first data unit or the first data padding unit, K is a positive integer greater than or equal to 1, and N is a positive integer greater than K.

* * * * *